United States Patent [19]

Korth

[11] Patent Number: 5,577,462
[45] Date of Patent: Nov. 26, 1996

[54] ANIMAL LITTER CONTAINER WITH CLEANING SCOOP

[76] Inventor: Donna J. Korth, 615 S. High St., Fort Atkinson, Wis. 53538

[21] Appl. No.: 490,444

[22] Filed: Jun. 6, 1995

[51] Int. Cl.⁶ .................................................. A01K 1/035
[52] U.S. Cl. ........................................................... 119/166
[58] Field of Search ............................. 119/165, 166, 119/170, 496, 497, 482

[56] References Cited

U.S. PATENT DOCUMENTS

| | | | |
|---|---|---|---|
| 3,490,417 | 1/1970 | Swinney | 119/496 |
| 3,710,761 | 1/1973 | Gregory | 119/496 |
| 3,809,013 | 5/1974 | Rigney et al. | 119/167 |
| 3,872,832 | 3/1975 | Quinn | 119/165 |
| 4,096,827 | 6/1978 | Cotter | 119/166 |
| 4,325,325 | 4/1982 | Larter | 119/166 |
| 4,926,794 | 5/1990 | Yamamoto | 119/165 |
| 4,970,987 | 11/1990 | Deyle | 119/166 |
| 5,012,765 | 5/1991 | Naso et al. | 119/166 |
| 5,032,254 | 7/1991 | Deboer et al. | 209/10 |
| 5,154,137 | 10/1992 | Stanaland | 119/496 |
| 5,168,834 | 12/1992 | Buschur | 119/166 |
| 5,181,480 | 1/1993 | Dabolt | 119/165 |
| 5,211,133 | 5/1993 | Foley | 119/166 |
| 5,259,340 | 11/1993 | Arbogast | 119/166 |
| 5,272,999 | 12/1993 | Nussle | 119/166 |
| 5,349,924 | 9/1994 | Hopper, Jr. | 119/496 |

FOREIGN PATENT DOCUMENTS 2180732  9/1985  United Kingdom .................. 119/166

*Primary Examiner*—Robert P. Swiatek
*Assistant Examiner*—Yvonne R. Abbott
*Attorney, Agent, or Firm*—DeWitt Ross & Stevens SC

[57] ABSTRACT

An animal litter container for separating reusable animal litter from clumps includes a disposal unit having a screen with a handle extending therefrom, and two shells which may be engaged to form an enclosure from which substantially no litter can escape. When the litter is to be cleaned, the disposal unit is placed with its handle extending outside the unused shell and its screen resting within. The shells are inverted so that the litter and waste falls from the used shell onto the screen and into the unused shell, and the used shell is removed. The handle is then used to lift the screen from the unused shell, sifting the waste clumps from the litter.

16 Claims, 5 Drawing Sheets

ANIMAL LITTER CONTAINER WITH CLEANING SCOOP

FIELD OF THE INVENTION

This invention pertains generally to the field of containers for the storage and disposal of animal litter and waste, and more particularly to containers for the storage and disposal of animal litter waste which include apparatus for separating waste from reusable litter.

BACKGROUND OF THE INVENTION

Many pet owners live under circumstances which require them to train their pets so that their pets perform their excretory functions in containers holding animal litter. Such circumstances include lack of available outdoor space in which the pets can perform their excretory functions, and even where such space is available, the pet owner's schedule may not afford the time to accompany the pet to such sites. Due to urbanization and the pace of modern life, these circumstances are becoming increasingly common. Thus, animal litter containers are becoming popular accessories for owners of not only cats, but also dogs, rabbits, and other animals.

The common animal litter container is generally some form of receptacle, usually box-like, which is designed to contain either non-clumping-type or clumping-type animal litter. The former type of litter is generally comprised of fibrous or granular particles which absorb moisture, and which may be treated with odor-absorbing chemicals and other additives to increase its life span, i.e., the length of time that the animal and pet owner can tolerate its use and presence. The life span of the litter can be increased by removing the animal waste from the litter, as by sifting the animal feces from the smaller litter particles. It may also be possible to sift urine-contaminated litter particles from unsoiled litter as well, since litter particles can swell when they absorb urine, and thus may be sifted out of the unsoiled litter due to their larger size. Clumping-type litter is similar to the non-clumping litter, but its particles bind to moisture and tend to agglomerate when they contact animal urine or feces. This litter has the advantage that soiled litter is more easily sorted from nonsoiled litter by a process of sifting the clump-like soiled litter agglomerations from the sand-like unsoiled litter. Because this process greatly increases the life span of the litter, the clumping-type litter is becoming increasingly popular. However, one drawback of this type of litter is that its dust, when inhaled, will adhere to mucous membranes in the lungs and sinuses. Therefore, excess agitation and other dust-creating manipulation of the litter should be avoided.

The prior art contains several examples of containers for animal litter and waste which include apparatus for cleaning animal waste from the container while retaining reusable animal litter. These containers generally use a mesh sifting operation to strain the animal wastes from fouled litter, leaving reusable litter behind. The containers are generally of two types. The first type are those that contain cleaning means whereby the container is cleaned by a complex cleaning mechanism. Examples are illustrated in U.S. Pat. No. 5,259,340 to Arbogast; U.S. Pat. No. 5,272,999 to Nussle; and U.S. Pat. No. 4,970,987 to Deyle. The second type of containers are those that utilize nonmechanical cleaning means. The container apparatus has no attached parts that move in relation to one another, i.e. the pet owner manipulates the fouled litter through the straining screen using a lifting, inverting, or other agitating operation. Examples are U.S. Pat. No. 5,168,834 to Buschur; U.S. Pat. No. 3,809,013 to Rigney et al.; and U.S. Pat. No. 5,211,133 to Foley The latter type of container has the advantage that it is generally easier to manufacture, easier to clean due to its simplicity, and more durable because it has no mechanism that will be fouled or corroded/degraded by animal wastes or used litter. However, despite these advantages, these latter containers still tend to have fouling of multiple components with animal wastes. The pet owner must generally be content to have animal waste residue remaining on one or more parts after a cleaning operation is completed, else he must manually rinse and scrub the residue from the container. Such manual cleaning is not only aesthetically unpleasant due to the smell and appearance of animal wastes, but also dangerous, since animal wastes can carry disease. As an example, feline wastes can harbor the microorganism that causes toxoplasmosis, and thus can be dangerous for pregnant and immunoimpaired persons to handle.

The prior art also contains apparatus which successfully avoid the need to clean residual waste from container components. U.S. Pat. No. 3,809,013 to bypasses the need for residual waste cleanup by simply making the cleaning apparatus, a sifting screen for separating waste from litter, disposable. However, a disposable screen entails the expense of replacement screens, and therefore it is desirable to have an animal litter container and cleaning apparatus that uses durable components meant for permanent use.

Other prior art devices disclose container and sifter designs which have lesser component fouling and cleaning problems than others.

U.S. Pat. No. 5,211,133 to Foley discloses a container comprised of a sifter which is placed within a receptacle and filled with litter. When the receptacle is to be cleaned of animal wastes, the sifter is lifted from the receptacle, causing the litter to fall from the sifter's mesh-like bottom into the receptacle. Animal waste is retained within the sifter. The disadvantage of the invention is that the planar sidewalls of the sifter are especially subject to fouling by animal wastes, and the invention also uses a relatively large number of components, thus increasing its manufacturing cost. A complete cleaning of the sifter would involve scrubbing or another aesthetically unpleasant manual form of cleaning. In addition, the sifter unit is inconvenient to replace within the receptacle after it is emptied of animal waste. After the sifter is lifted from the receptacle, the receptacle is left filled with litter, so the pet owner must either (1) empty the receptacle of litter, replace the sifter, and then refill the receptacle—a messy and time-consuming chore; or (2) try to push the sifter through the litter until it fully rests within the receptacle. This is a difficult task because the sifter's mesh bottom must be forced through the litter.

U.S. Pat. No. 5,168,834 to Buschur has similar disadvantages. This device has two receptacles, each having a rim bounding an inner cavity wherein litter may be placed. One receptacle is meant to be used as the animal litter container while the other is to be set aside for later use. When the used receptacle is to be cleaned, a screen-like sifter is clamped atop the rim of the used receptacle, the fresh receptacle is placed atop the sifter so that the two receptacles face each other with their cavities and rims adjacent but separated by the sifter, and the entire apparatus is inverted. Thus, the litter falls through the sifter from the used receptacle into the fresh receptacle, and the animal waste is left to rest on the sifter with the used receptacle resting above it. The sifter and the used receptacle are then unclamped from the fresh receptacle, which is now filled with litter, and the sifter and used receptacle are reinverted so that the used receptacle holds only the animal waste. The sifter is then unclamped from the used receptacle so that it may be emptied of animal waste. The disadvantage of Buschur's container is that inversion of the container will often fail to separate waste from litter. Instead, the container must be inverted, and then shaken so that all of the unused litter may be recovered. Furthermore, unless the receptacles are provided with some kind of liner, the used receptacle will be fouled with animal waste upon reinversion of the sifter and the used receptacle. In addition, the sifter itself contains several planar surfaces which are subject to fouling with animal waste, thereby requiring that the sifter itself be cleaned after each use.

SUMMARY OF THE INVENTION

The animal litter container of the present invention is directed to a container including cleaning means whereby animal waste may be separated from reusable litter without excessive fouling of the container components by animal waste, and whose cleaning means—a screen—may be quickly and easily rinsed of animal waste residue. The animal litter container is also designed so that cleaning can be effected with a minimum of litter spillage and litter dust dispersion. Due to its ease of cleaning and minimal spillage and dust dispersion, the animal litter container of the present invention reduces the dangers of litter cleaning for pregnant and immunoimpaired persons, or others subject to hazards from exposure to animal waste, animal waste residue, or animal litter. Furthermore, the animal litter container of the present invention utilizes few components, thereby increasing its manufacturing economy and ease of use.

An animal litter container for separating reusable animal litter from clumps in accordance with the present invention includes two shells, each including a perimeter, a plurality of walls depending from the perimeter, and a base attached to the plurality of walls. Each perimeter includes a flange adapted to releasibly align the perimeter of one shell to the perimeter of the other shell and thereby form an enclosure. The perimeter of each shell also includes a handle aperture. When the enclosure is formed, these handle apertures align into position adjacent one another. The animal litter container also includes a disposal unit which has a handle and an attached screen, with the screen being bounded by a screen perimeter. The screen is adapted to be placed between the shells and within the enclosure, and includes openings which are large enough to allow reusable animal litter to pass through the openings while retaining the clumps. When the screen is located within the enclosure, the handle fits between the perimeters of the shells and within the handle apertures.

The enclosure should be resistant to the leakage of animal litter from within. Thus, the perimeters of the shells include engagement means which hold the shells together in such a manner that animal litter is substantially unable to fit between the perimeters. Such engagement means can comprise the flanges themselves, and may extend about the entirety of the perimeters. To prevent leakage of litter from the handle apertures, the fit between the handle and the perimeters preferably produces a similar leak-resistant seal.

In order to prevent animal waste from fouling the shell(s), the screen perimeter is ideally shaped so that when the screen rests within one shell inside the enclosure, a major portion of the screen will rest adjacent to the shell in a complementary manner, thereby serving as a barrier between the animal waste and the shell. As an example, each shell may have a generally rectangular perimeter with four sidewalls depending therefrom, and a generally rectangular base attached to the sidewalls. The screen could then have a generally rectangular screen perimeter with four screen walls depending therefrom, and a generally rectangular screen bottom attached to the screen walls. The screen walls would rest adjacent and substantially parallel to the sidewalls, and the screen bottom would rest adjacent and substantially parallel to the base. The handle can extend from either the screen walls, the screen perimeter, or both.

Since animal litter containers often develop odor problems due to the animal waste within, the animal litter container may include means for retaining a deodorizer on the shells. Such means can take the form of a hollow vessel which contains deodorizer within, and which possibly has apertures extending through the sidewalls of the vessel so that the deodorizer's action can be more fully realized.

The animal litter container may also comprise a first and a second shell with each shell including an interior surface and a perimeter bounding the interior surface. The perimeter includes a flange adapted to releasibly align the perimeter of the first shell to the perimeter of the second shell and thereby form an enclosure which is substantially resistant to the leakage of animal litter between the perimeters. Each perimeter further includes an aligning disposal unit handle aperture. A disposal unit is also provided, and it includes a screen which has a screen perimeter bounding the screen and also at least one handle. The screen includes openings large enough to allow reusable animal litter to pass through while retaining the clumps. The screen is adapted to be placed between the first and second shells and within the enclosure. When it rests within the enclosure, the handle is oriented such that the handle fits within the handle aperture of each shell and abuts each shell's perimeter.

Further objects, features and advantages of the invention will be apparent from the following detailed description when taken in conjunction with the accompanying drawings.

DETAILED DESCRIPTION OF THE INVENTION

Figure 1:
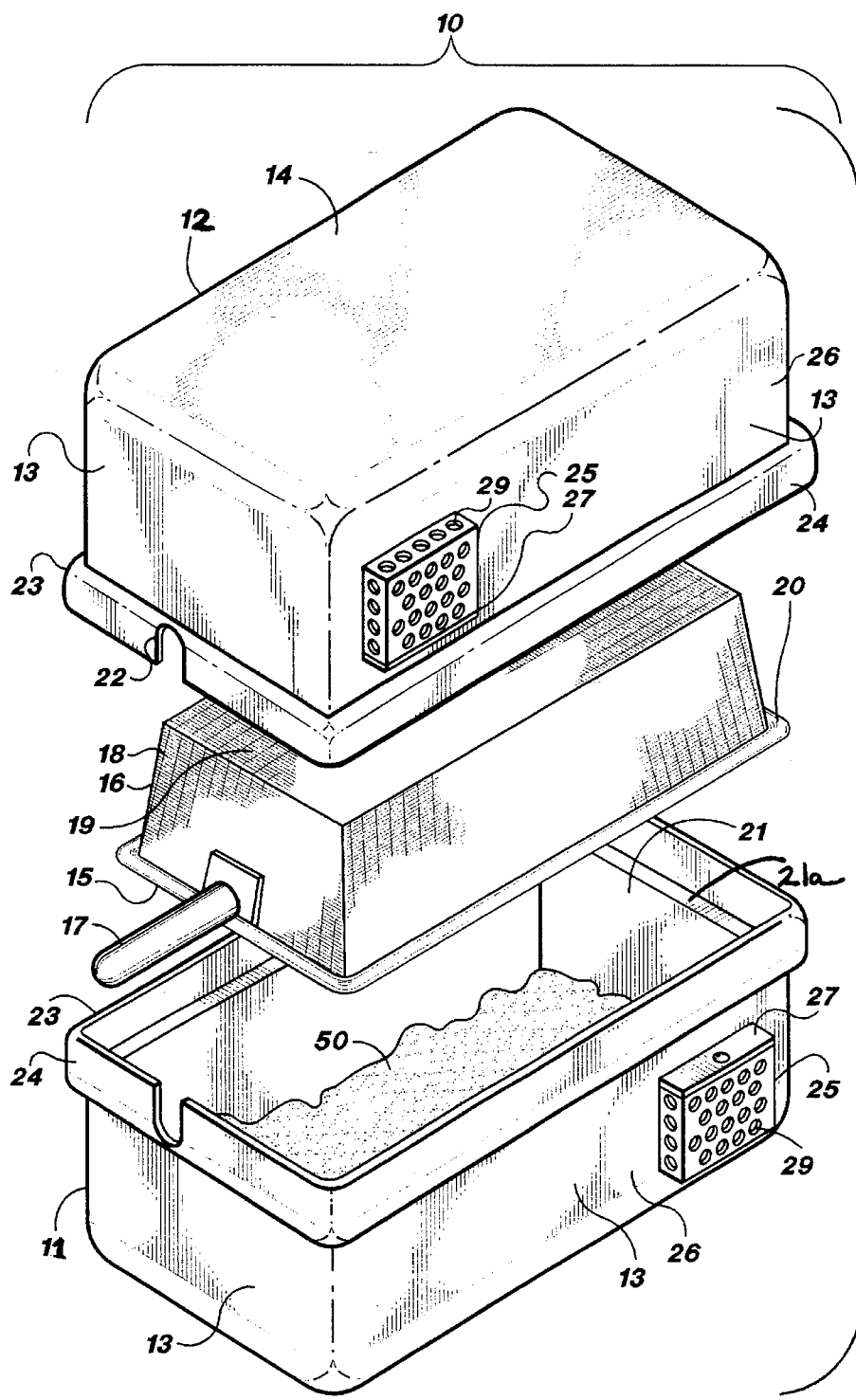
FIG. 1 is all exploded perspective view of the animal litter container of the present invention.

With reference to the drawings, in which the same or similar features are referred to by the same reference numbers, an animal litter container is shown generally at 10. The animal litter container 10 includes a first shell 11, a second shell 12, and a disposal unit 15. In the drawings, the first shell 11 is displayed containing animal litter 50. However, the second shell 12 may contain the animal litter 50 instead. The first shell 11, the second shell 12, and the disposal unit 15 may be manufactured from plastic, metal, or a similar material, and can be constructed in modular or integral form.

Each shell 11, 12 includes four sidewalls 13, a base 14, an interior surface 21 including a shelf 21a, and a shell perimeter 23. The first and second shells 11 and 12 are proportioned so that the interior surface 21 of either shell 11, 12 can accommodate the disposal unit 15 within, with the disposal unit 15 resting on the shelf 21a closely adjacent to the interior surface 21 of either shell 11 or 12. The shells 11, 12 are also provided with self-aligning handle apertures 22, which will be explained in the next paragraphs.

Figure 2:
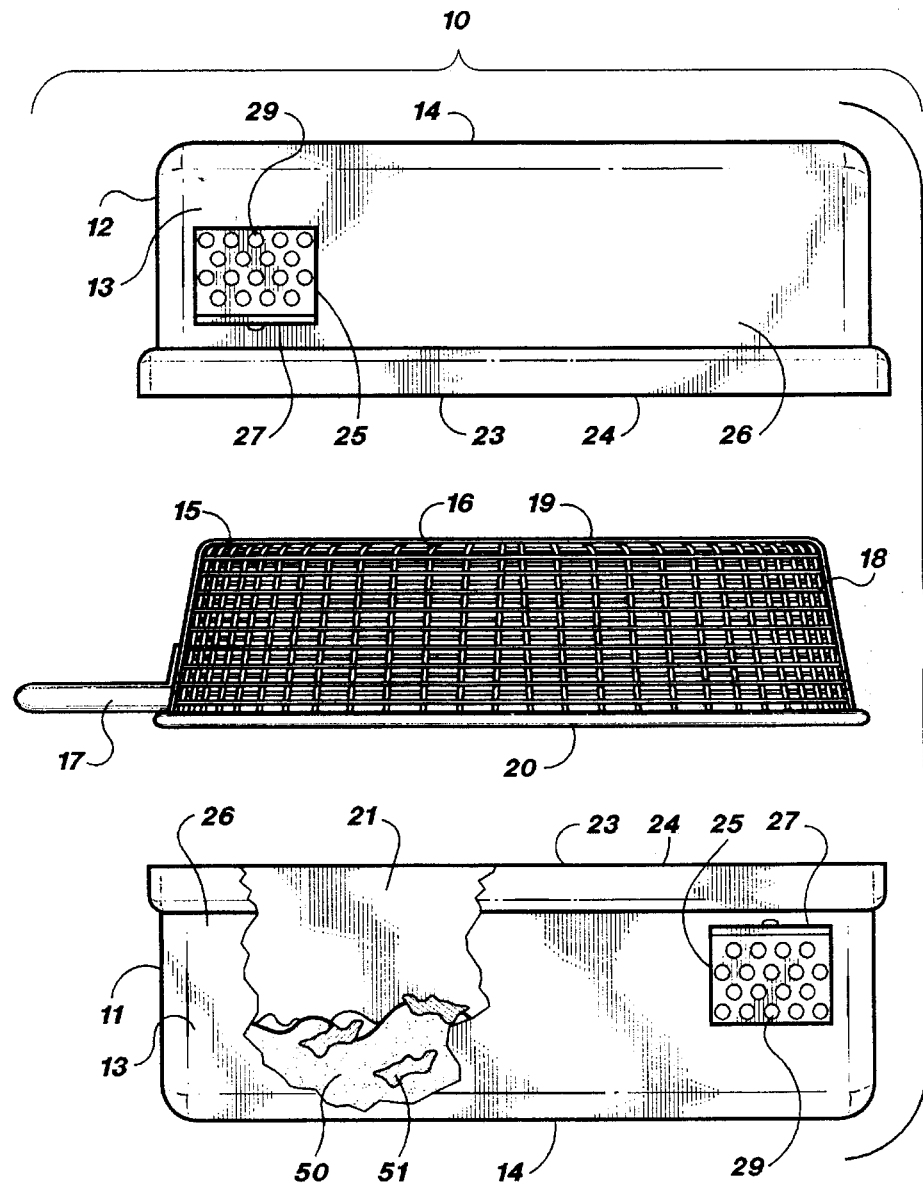
FIG. 2 is an exploded side elevation view of the animal litter container of FIG. 1, with a section cut away to expose the animal waste and litter within.
Figure 3:
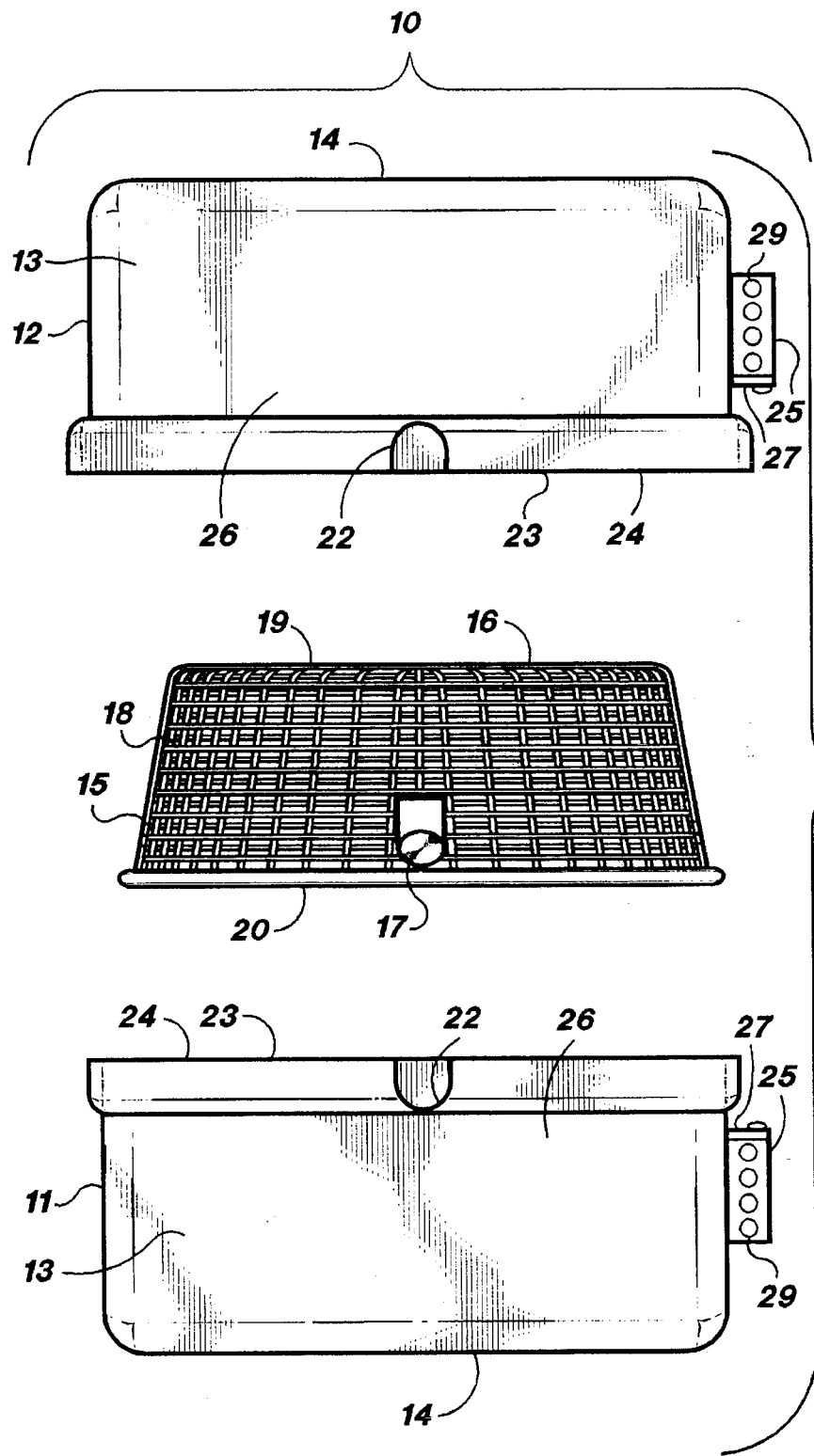
FIG. 3 is an exploded end elevation view of the animal litter container of FIG. 1, shown rotated 90° from the view of FIG. 2.
Figure 4:
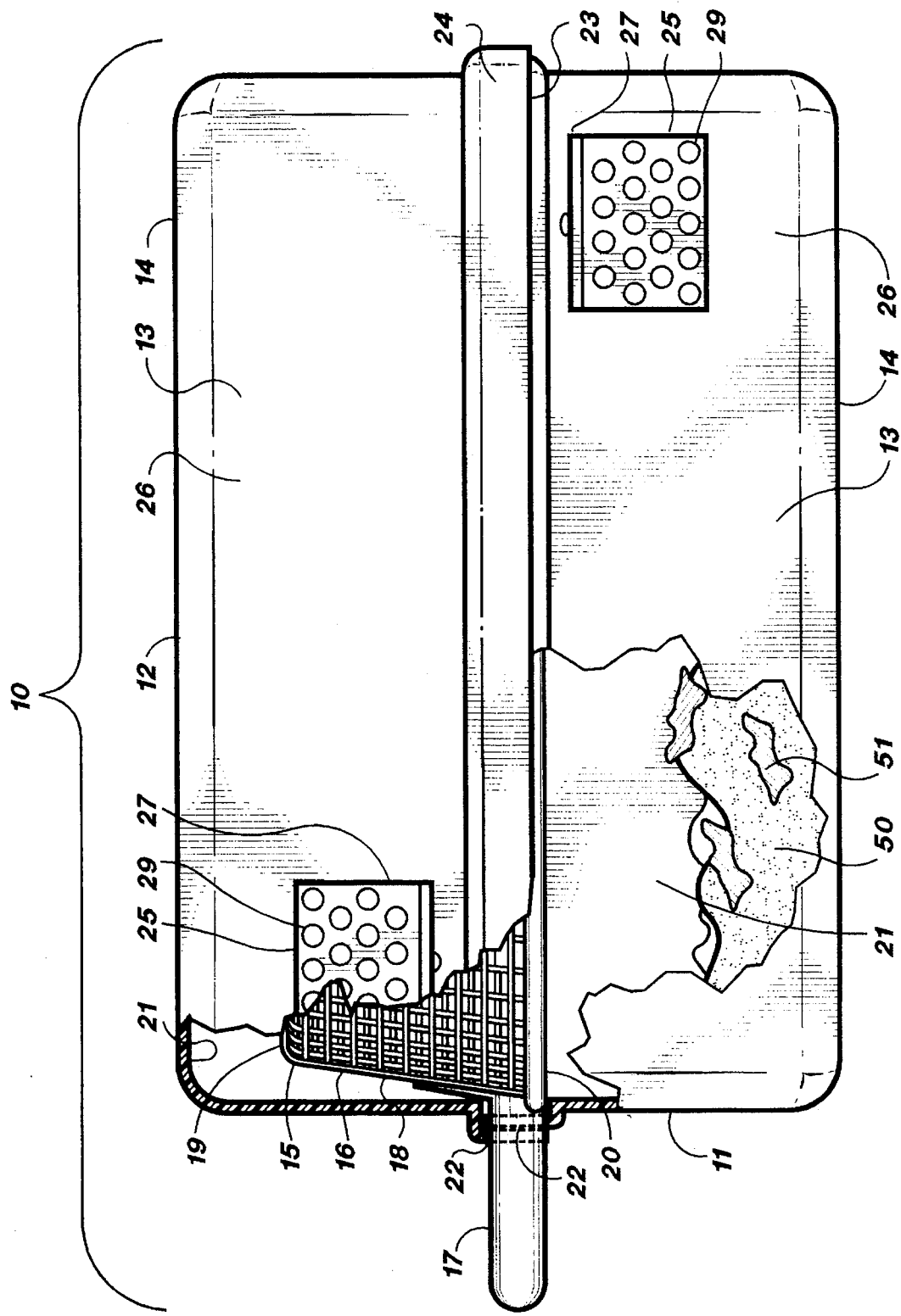
FIG. 4 is a partially cut away side elevation view of the animal litter container of FIG. 1 after it has been assembled.
Figure 5:
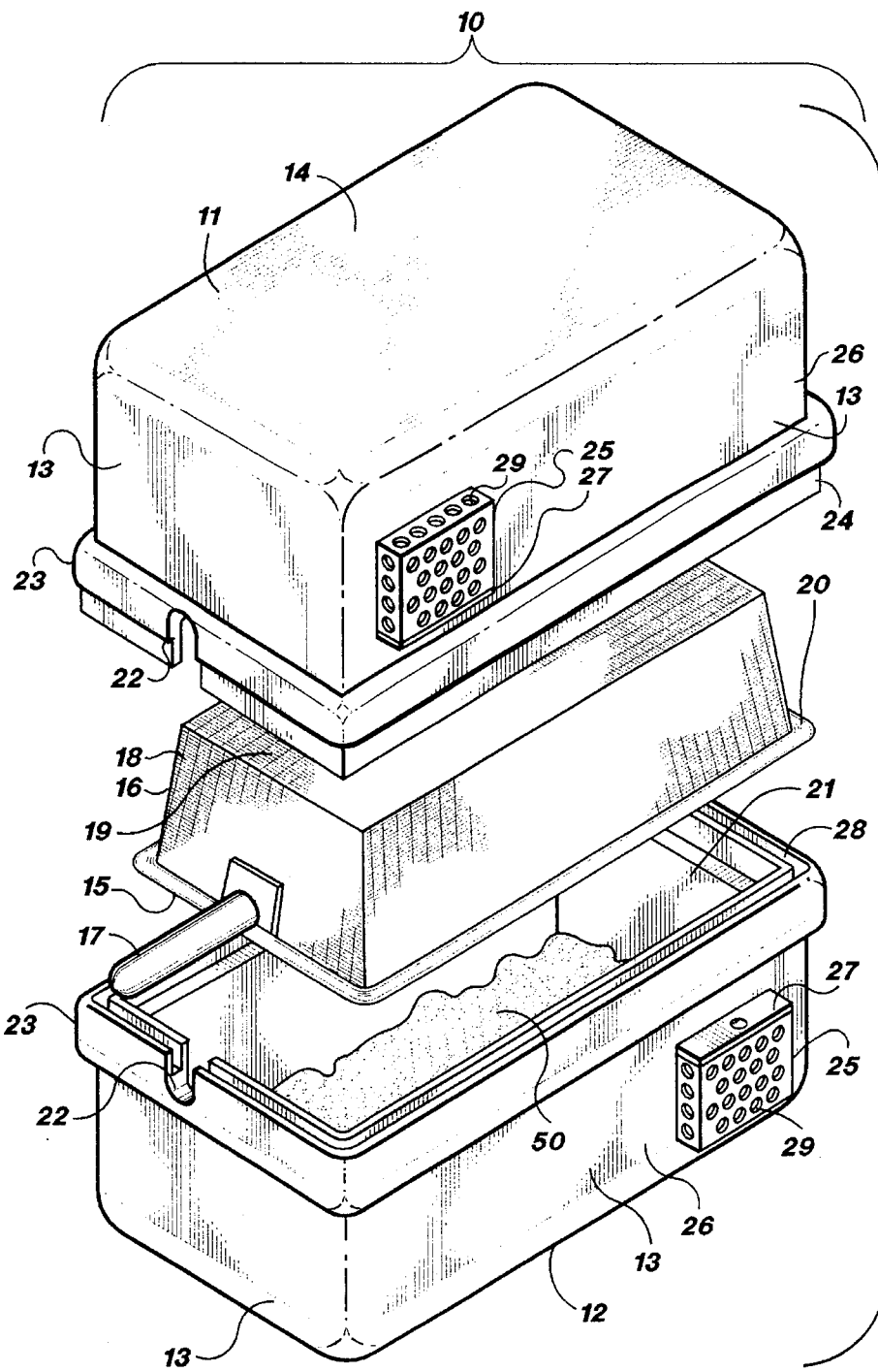
FIG. 5 is an exploded perspective view of an alternate embodiment of the animal litter container.

The disposal unit 15 includes a screen 16 and a handle 17. The screen 16 has screen sidewalls 18, a screen floor 19, all of which are made of mesh which includes openings which are sized to allow litter to pass through the openings while preventing the passage of clumps, e.g., approximately one-quarter square inch, and a screen perimeter 20. The mesh may be a basket-weave type of mesh, as shown in FIGS. 2–4, or an integrally formed type of mesh, as shown in FIGS. 1 and 5. The handle 17 may extend from either or both of the screen sidewalls 18 and the screen perimeter 20.

The first shell 11 and second shell 12 can be combined to form an enclosure bounded by the interior surfaces 21. Each shell perimeter 23 includes at least one flange 24. When the first shell 11 and the second shell 12 are located adjacent one another in symmetrical fashion with their shell perimeters 23 meeting, as illustrated in FIG. 4, the flanges 24 rest closely adjacent one another in parallel fashion, and preferably form a seal. The disposal unit 15 may rest on the shelf 21a within either shell 11, 12 inside the enclosure, and its handle 17 may extend through the adjacent handle apertures 22 and outside the enclosure.

Because animal litter containers generally develop odor problems, the first shell 11 and/or the second shell 12 may include deodorizer retention means for holding odor-absorbent materials, such as solid deodorizers (e.g. baking soda or commercially available deodorizer cakes) or liquid/gel deodorizers. The deodorizer retention means may take the form of a hollow deodorizer vessel 25 which rests on an outer surface 26 of the shells, perhaps including a lid 27 or other closure means. The walls of the deodorizer vessel 25 may be foraminated with venting apertures 29 so that the scent of the deodorizer is dispersed throughout the immediate area, but any venting apertures 29 in the deodorizer vessel 25 should be of such a size that the deodorizer cannot fall from the deodorizer vessel 25. For example, FIGS. 1–5 display a deodorizer vessel which would likely be used in combination with a common household solid deodorizer cake. A deodorizer vessel 30 meant for use with powdered deodorizer would require smaller venting apertures 29. If venting apertures 29 are provided between the interior surface 21 of a shell and the deodorizer vessel 25, the scent may be dispersed into the animal litter container 10 as well. The deodorizer retention means could also merely comprise a clip or series of hooks which retain a deodorizer cake against the outer surface 26.

The usage of the animal litter container 10 is outlined as follows. The first shell 11 is placed on its base 14 and filled approximately one-quarter to one-third full of animal litter 50, preferably the clumping-type litter, as illustrated in FIG. 1. The animal then enters that shell when it wishes to perform its excretory functions, leaving its waste 51, illustrated in FIGS. 2 and 4, on the litter 50.

When the first shell 11 becomes fouled with animal waste to such an extent that the animal's owner wishes it cleaned, the owner fixes the disposal unit 15 within the second shell 12 in the orientation shown in FIGS. 1–3, with the handle 17 extending from the handle aperture 22 of the second shell 12. When the disposal unit 15 is placed in this position, the screen 16 rests closely adjacent to the interior surface 21 of the second shell 12. The animal's owner then takes the second shell 12 (with the disposal unit 15 within) and places it atop the first shell 11 so as to form an enclosure, as shown in FIG. 4. When this occurs, the handle apertures 22 align into a position adjacent one another and the handle 17 rests within the handle apertures 22. The flanges 24 rest closely adjacent one another in a parallel relation. Ideally, the fit between the handle 17 and the shell perimeter 23 surrounding the handle apertures 22, and also between the flanges 24 of the first shell 11 and second shell 12, is such that animal litter 50 cannot fit between them when the enclosure is formed.

The first shell 11 and second shell 12 are then inverted so that the first shell 11 rests atop the second shell 12. This may be done by grasping the handle 17 and rotating it axially about its lengthwise axis, or by simply handling and inverting the shells themselves. The surface of the handle 17 may be roughened or it may include raised protrusions to allow it to be better gripped for this purpose. When the shells are inverted, the animal litter 50 falls into the screen 16 of the disposal unit 15.

During the inversion process, the animal waste 51 does not foul either the first shell 11 or the second shell 12 with animal waste residue. The litter 50 protects the interior surface 21 of the first shell 11 from fouling, and the waste never contacts the interior surface 21 of the second shell 12 because the basket-like shape of the screen 16 prevents the animal waste from ever contacting it. The only component that experiences waste fouling is the screen 16 of the disposal unit 15.

Thus, the animal owner need never scrub the interior surface 21 of the first or second shells 11 and 12 free of animal waste residue. This greatly enhances the safety of litter cleaning for pregnant or immunoimpaired persons, who are susceptible to various types of diseases borne by animal wastes.

After the first shell 11 is emptied into the second shell 12 by the inversion process, the first shell 11 may be lifted from the disposal unit 15 and the second shell 12 and placed to the side. The animal owner may then grasp the handle 17 and lift the screen 16 from the second shell 12. The animal litter 50 may easily sift through the apertures of the screen 16, while the animal waste cannot.

Thus, the animal waste is retained within the screen 16.

If the animal owner so desires, the animal owner may agitate the handle 17 to shake the screen 16 and dislodge any reusable litter 50 that may have adhered to the waste. The handle 17 allows the screen 16 to clean animal waste 51 from reusable litter 50 without requiring the pet owner to lift the heavy litter-filled enclosure, or even a single litter-filled shell, to effect such cleaning. After the screen 16 is fully lifted from the second shell 12, the second shell 12 is full of reusable litter 50 and ready for the animal's continued use.

The animal owner may then use the handle 17 to carry the disposal unit 15 to the trash and dispose of the animal waste 51 by inverting the screen 16 and pouring the waste out. The disposal unit 15 can then be quickly and easily cleaned of any remaining animal waste residue by immersing the screen 16 in warm soapy water while agitating the handle 17, thereby swirling the screen 16 throughout the water. Alternatively, the entire disposal unit 15 could be placed in a household dishwasher; its pan-like shape lends itself well to this form of cleaning. In summary, the animal owner need never touch animal waste or animal waste residue to effect its disposal and removal from the screen 16.

After the disposal unit 15 is cleaned, it may be placed within the first shell 11 and left therein until the litter-filled second shell 12 is ready for cleaning. At that point, the first shell 11 and disposal unit 15 can be placed atop the second shell 12. The second shell 12 may be cleaned by the aforementioned method in the same manner that the first shell 11 was cleaned.

Since the animal litter container is cleaned by the use of an inversion process, it is important that the first shell 11 and second shell 12 form a substantially leak-proof seal about the shell perimeter 23 when the shells are engaged. FIGS. 1–4 show a single-flange embodiment of the animal litter container wherein one flange 24 overlaps the other. This seal between the flanges 24 prevents litter 50 from spilling to the floor, and it also prevents litter dust from escaping where it may be inhaled by the animal or the animal's owner. To further ensure that no litter 50 leakage occurs during cleaning, it is also important that the perimeters 23 surrounding the handle apertures 22 form a substantially leak-proof seal in combination with the handle 17 when the handle 17 rests within.

FIG. 5 shows an alternate embodiment of the invention including an alternate seal wherein the second shell 12 has two flanges 24 which are adjacent and parallel to one another with a perimeter groove 28 thereby formed in between them. The flange 24 of the first shell 11 may fit within the perimeter groove 28 and thereby form a seal about the shell perimeter 23 when the enclosure is formed. The perimeter groove 28 and flange 24 arrangement is a highly effective alternate means of sealing the first shell 11 and second shell 12 for leak-proof inversion.

It is understood that the invention is not confined to the particular construction and arrangement of parts herein illustrated and described, but embraces such modified forms thereof as come within the scope of the claims.

What is claimed is:

1. An animal litter container for separating reusable animal litter from clumps comprising:
   a. first and second shells, wherein each shell includes a perimeter, a plurality of walls depending from the perimeter, and a base attached to the plurality of walls, wherein the perimeter includes a flange adapted to releasably align the perimeter of the first shell to the perimeter of the second shell and thereby form an enclosure, and wherein the perimeter further includes an aligning disposal unit handle aperture; and
   b. a disposal unit including a screen which is adapted to be placed between the first and second shells and within the enclosure, the screen including openings large enough to allow reusable animal litter to pass through while retaining the clumps, a surrounding screen perimeter, and at least one handle attached to the screen and extending therefrom in such a fashion that it rests at least partially within both the disposal unit handle aperture of the first shell and the disposal unit handle aperture of the second shell when the disposal unit is located within the enclosure.

2. The animal litter container of claim 1 wherein the at least one handle abuts both the perimeter of the first shell and the perimeter of the second shell when the disposal unit is located within the enclosure, thereby forming a seal between the first shell and the second shell.

3. The animal litter container of claim 1 wherein the perimeter of the first shell and the perimeter of the second shell include engagement means for affixing the perimeter of the first shell to the perimeter of the second shell.

4. The animal litter container of claim 3 wherein the engagement means extends over substantially the entire perimeter.

5. The animal litter container of claim 3 wherein the engagement means comprises the flange of the first shell and the flange of the second shell.

6. The animal litter container of claim 1 wherein the at least one handle extends from the screen at a substantially perpendicular angle.

7. The animal litter container of claim 1 wherein the screen rests adjacent the first shell or the second shell in complementary fashion when the disposal unit is placed within the enclosure.

8. The animal litter container of claim 1 wherein the screen comprises a plurality of screen walls depending from the screen perimeter and a screen bottom attached to the screen walls.

9. The animal litter container of claim 8 wherein the screen bottom is generally rectangular.

10. The animal litter container of claim 8 wherein the at least one handle extends from a screen wall.

11. The animal litter container of claim 1 wherein the at least one handle extends from the screen perimeter.

12. The animal litter container of claim 1 wherein the first shell and the second shell are substantially symmetrical.

13. The animal litter container of claim 1 wherein the first shell and the second shell each include a generally rectangular perimeter, a generally rectangular base oriented substantially parallel to the perimeter, and four walls depending from the perimeter and joined to the base.

14. The animal litter container of claim 1 further comprising deodorizer retention means for holding odor-absorbent materials onto one of the first shell and the second shell.

15. The animal litter container of claim 14 wherein the deodorizer retention means includes a hollow containment vessel.

16. An animal litter container for separating reusable animal litter from clumps comprising:
   a. first and second shells, each including an interior surface and a perimeter bounding the interior surface, wherein the perimeter includes a flange adapted to releasably align the perimeter of the first shell to the perimeter of the second shell and thereby form an enclosure which is substantially resistant to the leakage of animal litter between the perimeter of the first shell and the perimeter of the second shell, and wherein the perimeter further includes an aligning disposal unit handle aperture; and
   b. a disposal unit including a screen which is adapted to be placed between the first and second shells and within the enclosure, the screen including openings large enough to allow reusable animal litter to pass through while retaining the clumps, a screen perimeter bounding the screen, and at least one handle extending from the screen, with the at least one handle oriented such that when the disposal unit rests within the enclosure, the at least one handle fits within the handle aperture of the first shell and abuts the perimeter of the first shell and also fits within the handle aperture of the second shell and abuts the perimeter of the second shell.

\* \* \* \* \*